(12) United States Patent
Kim et al.

(10) Patent No.: US 8,800,164 B2
(45) Date of Patent: Aug. 12, 2014

(54) WASHING MACHINE, POWER MANAGEMENT APPARATUS AND METHOD OF CONTROLLING THE SAME

(75) Inventors: Hyun Sook Kim, Hwaseong-si (KR); Eun Suk Bang, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 280 days.

(21) Appl. No.: 13/352,836

(22) Filed: Jan. 18, 2012

(65) Prior Publication Data

US 2012/0192450 A1    Aug. 2, 2012

(30) Foreign Application Priority Data

Feb. 1, 2011    (KR) .................. 10-2011-0010246

(51) Int. Cl.
*F26B 19/00*    (2006.01)

(52) U.S. Cl.
USPC ................. 34/493; 34/546; 34/562; 34/595; 34/607; 700/296; 705/412; 318/760; 68/12.16; 137/597; 165/287

(58) Field of Classification Search
USPC ............. 34/427, 493, 553, 546, 562, 90, 595, 34/601, 603, 607, 610; 700/291, 295, 296; 705/40, 412; 318/66, 760; 68/12.01, 68/12.16, 12.06; 137/597; 165/287
See application file for complete search history.

(56) References Cited

U.S. PATENT DOCUMENTS

| | | | | | |
|---|---|---|---|---|---|
| 2,142,042 | A | * | 12/1938 | Bowdoin et al. | 34/486 |
| 2,217,153 | A | * | 10/1940 | Bowdoin et al. | 34/527 |
| 2,577,104 | A | * | 12/1951 | Butler | 34/572 |
| 2,718,066 | A | * | 9/1955 | Engel | 34/546 |
| 2,722,057 | A | * | 11/1955 | Pugh | 34/74 |
| 3,027,653 | A | * | 4/1962 | Long et al. | 34/86 |
| 3,031,768 | A | * | 5/1962 | Kurowski | 34/527 |
| 4,019,259 | A | * | 4/1977 | Veraart | 34/550 |
| 4,112,590 | A | * | 9/1978 | Muller | 34/75 |
| 4,622,759 | A | * | 11/1986 | Abe et al. | 34/546 |
| 4,649,654 | A | * | 3/1987 | Hikino et al. | 34/493 |
| 5,101,575 | A | * | 4/1992 | Bashark | 34/562 |
| 6,199,300 | B1 | * | 3/2001 | Heater et al. | 34/446 |
| 7,127,832 | B2 | * | 10/2006 | Park et al. | 34/562 |
| 8,015,726 | B2 | * | 9/2011 | Carow et al. | 34/381 |
| 8,201,345 | B2 | * | 6/2012 | Dalton et al. | 34/389 |

(Continued)

FOREIGN PATENT DOCUMENTS

| EP | 915199 A1 * | 5/1999 | .............. D06F 58/28 |
|---|---|---|---|
| EP | 1413936 | 4/2004 | |

(Continued)

*Primary Examiner* — Steve M Gravini
(74) *Attorney, Agent, or Firm* — Staas & Halsey LLP

(57) ABSTRACT

In a washing machine, a power management apparatus and a method of controlling the same, washing operation and drying operation commands are input by a user, power rate information for each time period is received from an EMS, a drying operation execution time is confirmed, and power rates corresponding to the drying operation execution time are determined based on the power rate information for each time period. Then, the power rates corresponding to the drying operation execution time are compared with the standard power rates to determine whether the power rates corresponding to the drying operation execution time are higher than the standard power rates, and an algorithm of a final spinning mode in the washing operation is adjusted if the power rates corresponding to the drying operation execution time are higher than the standard power rates.

43 Claims, 10 Drawing Sheets

(56) References Cited

U.S. PATENT DOCUMENTS

| | | | |
|---|---|---|---|
| 8,353,114 B2* | 1/2013 | Beers et al. | 34/343 |
| 2004/0237338 A1* | 12/2004 | Rump et al. | 34/607 |
| 2005/0252028 A1* | 11/2005 | Park et al. | 34/528 |
| 2006/0191161 A1* | 8/2006 | Wunderlin et al. | 34/562 |
| 2006/0288608 A1* | 12/2006 | Carow et al. | 34/604 |
| 2008/0120868 A1* | 5/2008 | Morrison et al. | 34/572 |
| 2008/0313920 A1* | 12/2008 | Finke et al. | 34/389 |
| 2009/0119942 A1* | 5/2009 | Aisenberg et al. | 34/418 |
| 2009/0126222 A1* | 5/2009 | Bae et al. | 34/527 |
| 2009/0260256 A1* | 10/2009 | Beaulac | 34/528 |
| 2011/0047812 A1* | 3/2011 | Sugimoto et al. | 34/427 |
| 2012/0112683 A1* | 5/2012 | Suel, II | 318/760 |
| 2012/0158204 A1* | 6/2012 | Song et al. | 700/296 |
| 2012/0192450 A1* | 8/2012 | Kim et al. | 34/427 |
| 2013/0268134 A1* | 10/2013 | TULLER | 700/291 |
| 2013/0276327 A1* | 10/2013 | DOH et al. | 34/480 |

FOREIGN PATENT DOCUMENTS

| | | | |
|---|---|---|---|
| EP | 1441430 | 7/2004 | |
| EP | 1652988 A2 * | 5/2006 | D06F 37/30 |
| JP | 06071097 A * | 3/1994 | D06F 58/28 |
| JP | 2000014960 A * | 1/2000 | D06F 33/02 |
| JP | 2009-09548 | 7/2009 | |
| KR | 10-2004-0046209 | 5/2004 | |
| KR | 10-2007-0056591 | 4/2007 | |
| WO | WO 03018897 A1 * | 3/2003 | D06F 19/00 |
| WO | 2011/006828 | 1/2011 | |

\* cited by examiner

WASHING MACHINE, POWER MANAGEMENT APPARATUS AND METHOD OF CONTROLLING THE SAME

CROSS-REFERENCE TO RELATED APPLICATIONS

This application claims the benefit of Korean Patent Application No. 2011-0010246, filed on Feb. 1, 2011 in the Korean Intellectual Property Office, the disclosure of which is incorporated herein by reference.

BACKGROUND

1. Field

Embodiments relate to a washing machine, a power management apparatus, and a method of controlling the same to conserve power.

2. Description of the Related Art

With the development of Information Technology (IT), the number of household appliances powered by electricity is rapidly increasing, in turn leading to increasing power consumption. As can be seen from a power demand pattern, peak capacity is not reached during most days of the year, that is to say, power plants only operate at full capacity during a few days out of the year.

A state in which a high power demand is required for a short time is called peak load. Costs for constructing an additional power plant are extremely high and maintenance costs for power plants constructed to maintain peak load for a short period are considerable.

Recently, numerous developers are conducting intensive research into a demand management method for temporarily restricting power consumption by limiting peak load without constructing such additional power plants. For the aforementioned purposes, demand management is a focus of attention, and a great deal of research is focused upon an advanced demand management format for demand response (DR).

DR is a system for intelligently managing energy consumption depending upon variation in power rates. That is, the consumer uses power in response to power rates rather than according to an ordinary power consumption pattern.

By means of the DR, a power-supply source can alter user power consumption to achieve load balancing and can restrict user power consumption to periods when demand is low, thereby reducing the user's overall energy expenditure.

Therefore, smart electric devices to which DR is applied and an energy management system (EMS) which controls the operations of the smart electric devices have been developed. The EMS informs the user of power rate information and turns an electric device on or off on the basis of the power rate information. Accordingly, the user cannot obtain a result at a desired time.

For example, a washing machine or a drying machine heats air and dries clothes using the heated air when performing a drying operation, and thus the total power consumption as well as instantaneous power consumption are very high. Accordingly, the washing machine or the drying machine may not perform the drying operation in case of high power rates and the user cannot obtain dried clothes at a desired time.

Furthermore, if the washing machine or the drying machine is driven in a high power rate period to dry clothes when the user wants, the dry level the user expects is not obtained since the washing machine or the drying machine performs the drying operation in a state in which the operations of all components thereof are deteriorated.

SUMMARY

Therefore, it is an aspect to provide a washing machine, a power management apparatus and a method for controlling the same so as to adjust an algorithm of a final spinning mode if power rates are higher than standard power rates before the final spinning mode in a state in which a drying operation is selected.

It is another aspect to provide a washing machine, a power management apparatus and a method for controlling the same so as to adjust an algorithm of a final spinning mode if a drying environment is not suitable for drying before the final spinning mode in a state in which a drying operation is selected.

Additional aspects will be set forth in part in the description which follows and, in part, will be obvious from the description, or may be learned by practice of the invention.

In accordance with one aspect, there is provided a washing machine which may include: a communication unit to receive power rate information for each time period from an energy management system (EMS); an input unit to receive an operation command from a user; and a controller to determine whether a drying operation execution time includes a time period corresponding to power rates higher than standard power rates based on the power rate information for each time period when a washing operation command and a drying operation command are input, and adjust an algorithm of a final spinning mode in the washing operation if the drying operation execution time includes the time period corresponding to power rates higher than the standard power rates.

The controller may extend a final spinning time when adjusting the final spinning mode algorithm.

The controller may increase a spinning speed when adjusting the final spinning mode algorithm.

The controller may control the final spinning mode to be repeated if the drying operation execution time includes the time period corresponding to power rates higher than the standard power rates.

The controller may repeatedly increase and decrease a spinning speed when adjusting the final spinning mode algorithm.

The controller may control the final spinning mode to be performed according to a predetermined algorithm when the drying operation execution time does not include the time period corresponding to power rates higher than the standard power rates.

The controller may confirm power rates corresponding to the drying operation execution time before the washing machine enters the final spinning mode.

If the power rates corresponding to the drying operation execution time are higher than the standard power rates, the controller may adjust the final spinning mode algorithm based on a difference between the power rates corresponding to the drying operation execution time and the standard power rates.

The communication unit may receive temperature and humidity information from a weather server, and the controller may calculate suitability for drying based on the temperature and humidity information, compare the suitability with a reference value, and adjust the final spinning mode algorithm if the suitability is lower than the reference value.

The final spinning mode may be performed according to a predetermined algorithm if the suitability is higher than or equal to the reference value.

The washing machine may further include a temperature sensor to sense external temperature and a humidity sensor to sense external humidity, wherein the controller calculates suitability for drying based on the temperature and humidity information, compares the suitability with a reference value, and adjusts the final spinning mode algorithm if the suitability is lower than the reference value.

The controller may adjust a driving factor of the drying operation if the power rates corresponding to the drying operation execution time are higher than the standard power rates.

The controller may adjust the drying operation execution time if the power rates corresponding to the drying operation execution time are higher than the standard power rates.

In accordance with another aspect, there is provided a method of controlling a washing machine, which may include: receiving power rate information for each time period from an EMS when a washing operation command and a drying operation command are input by a user; confirming a drying operation execution time; determining power rates corresponding to the drying operation execution time based on the power rate information for each time period; comparing the power rates corresponding to the drying operation execution time with standard power rates, and determining whether the power rates are higher than the standard power rates; and adjusting an algorithm of a final spinning mode in the washing operation if the power rates corresponding to the drying operation execution time are higher than the standard power rates.

The adjusting of the final spinning mode algorithm may include extending a final spinning time.

The adjusting of the final spinning mode algorithm may include increasing a spinning speed.

The adjusting of the final spinning mode algorithm may include controlling the final spinning mode to be repeated.

The adjusting of the final spinning mode algorithm may include repeatedly increasing and decreasing the spinning speed.

The method may further include controlling the final spinning mode to be performed according to a predetermined algorithm if the power rates corresponding to the drying operation execution time are lower than or equal to the standard power rates.

The determining of whether the power rates are higher than the standard power rates may include determining whether there is a time period corresponding to power rates higher than the standard power rates.

The confirming of the power rates corresponding to the drying operation execution time may include confirming the power rates corresponding to the drying operation execution time before the washing machine enters the final spinning mode.

The method may further include receiving temperature and humidity information from a weather server before the washing machine enters the final spinning mode, calculating suitability for drying based on the temperature and humidity information, comparing the suitability with a reference value and adjusting the final spinning mode algorithm if the suitability is lower than the reference value, and performing the final spinning mode based on the predetermined algorithm if the suitability is higher than or equal to the reference value.

The method may further include driving a fan before the washing machine enters the final spinning mode and sensing external temperature and external humidity, calculating suitability for drying based on the temperature and humidity information, comparing the suitability with a reference value and adjusting the final spinning mode algorithm if the suitability is lower than the reference value.

The method may further include adjusting at least one of a driving factor of the drying operation and the drying operation execution time if the power rates corresponding to the drying operation execution time are higher than the standard power rates.

In accordance with another aspect, there is provided a washing machine which may include: a communication unit to receive power rate information for each time period through an EMS and receive drying operation information of a drying machine through the EMS; and a controller to determine whether a drying operation execution time of the drying machine includes a time period corresponding to power rates higher than standard power rates based on the power rate information for each time period when a washing operation is selected, and adjust an algorithm of a final spinning mode in the washing operation if the drying operation execution time of the drying machine includes the time period corresponding to power rates higher than the standard power rates.

The washing machine may further include an input unit to which the drying operation execution time of the drying machine is input, wherein the controller may determine whether the input drying operation execution time includes a time period corresponding to power rates higher than the standard power rates when the drying operation execution time is input, and may adjust the algorithm of the final spinning mode in the washing operation if the input drying operation execution time includes the time period corresponding to power rates higher than the standard power rates.

The controller may perform at least one of extending a final spinning time, increasing a spinning speed, and repeatedly increasing and decreasing the spinning speed when adjusting the algorithm of the final spinning mode.

The controller may control the final spinning mode to be repeated if the drying operation execution time of the drying machine includes the time period corresponding to power rates higher than the standard power rates.

The controller may control the final spinning mode to be performed based on a predetermined algorithm if the drying operation execution time of the drying machine does not include the time period corresponding to power rates higher than the standard power rates.

The communication unit may receive temperature and humidity information from a weather server, and the controller may calculate suitability for drying based on the temperature and humidity information, compare the suitability with a reference value, adjust the final spinning mode algorithm if the suitability is lower than the reference value, and perform the final spinning mode according to the predetermined algorithm if the suitability is higher than or equal to the reference value.

In accordance with another aspect, there is provided a method of controlling a washing machine, which may include: determining whether a drying operation of a drying machine is selected when a washing operation is selected; receiving power rate information for each time period and drying operation information of the drying machine through an EMS upon receiving a drying operation selection signal for the drying machine; determining whether a drying operation execution time of the drying machine includes a time period corresponding to power rates higher than standard power rates based on the power rate information for each time period; and adjusting an algorithm of a final spinning mode in the washing operation if the drying operation execution time of the drying machine includes the time period corresponding to power rates higher than the standard power rates.

The adjusting of the final spinning mode algorithm may include performing at least one of extending a final spinning time, repeatedly increasing and decreasing a spinning speed and increasing the spinning speed.

The adjusting of the final spinning mode algorithm may include controlling the final spinning mode to be repeated.

The method may further include controlling the final spinning mode to be performed according to a predetermined algorithm if power rates corresponding to the drying operation execution time are lower than or equal to the standard power rates.

The method may further include receiving information about an excess time corresponding to power rates higher than the standard power rates from the EMS, determining whether the drying operation execution time includes the excess time, and adjusting the algorithm of the final spinning mode in the washing operation if the drying operation execution time includes the excess time.

The method may further include: receiving temperature and humidity signals from the drying machine if drying operation execution time does not include the time period corresponding to power rates higher than the standard power rates; calculating suitability for drying based on the temperature and humidity signals; comparing the suitability with a reference value and adjusting the final spinning mode algorithm if the suitability is lower than the reference value; and performing the final spinning mode according to the predetermined algorithm if the suitability is higher than or equal to the reference value.

In accordance with another aspect, there is provided a power management apparatus which may include: a communication unit to perform communication with a washing machine and a drying machine; and a controller to determine whether a drying operation of the drying machine is selected when a washing operation selection signal is input from the washing machine, determine whether power rates corresponding to a drying operation execution time of the drying machine are higher than standard power rates when the drying operation of the drying machine is selected, adjust an algorithm of a final spinning mode of the washing machine if the power rates corresponding to the drying operation execution time are higher than the standard power rates, and control the adjusted final spinning mode algorithm to be transmitted to the washing machine.

The controller may transmit temperature and humidity sensing commands to the drying machine when a final spinning mode entry signal is transmitted from the washing machine, calculate suitability for drying based on sensed temperature and humidity information when the temperature and humidity information is transmitted from the drying machine, compare the suitability with a reference value, adjust the algorithm of the final spinning mode if the suitability is lower than the reference value, and control transmission of the adjusted final spinning mode algorithm to the washing machine.

The controller may perform at least one of extending a final spinning time, repeatedly increasing and decreasing a spinning speed, and increasing the spinning speed.

The display information may be at least one of color information and icon information.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
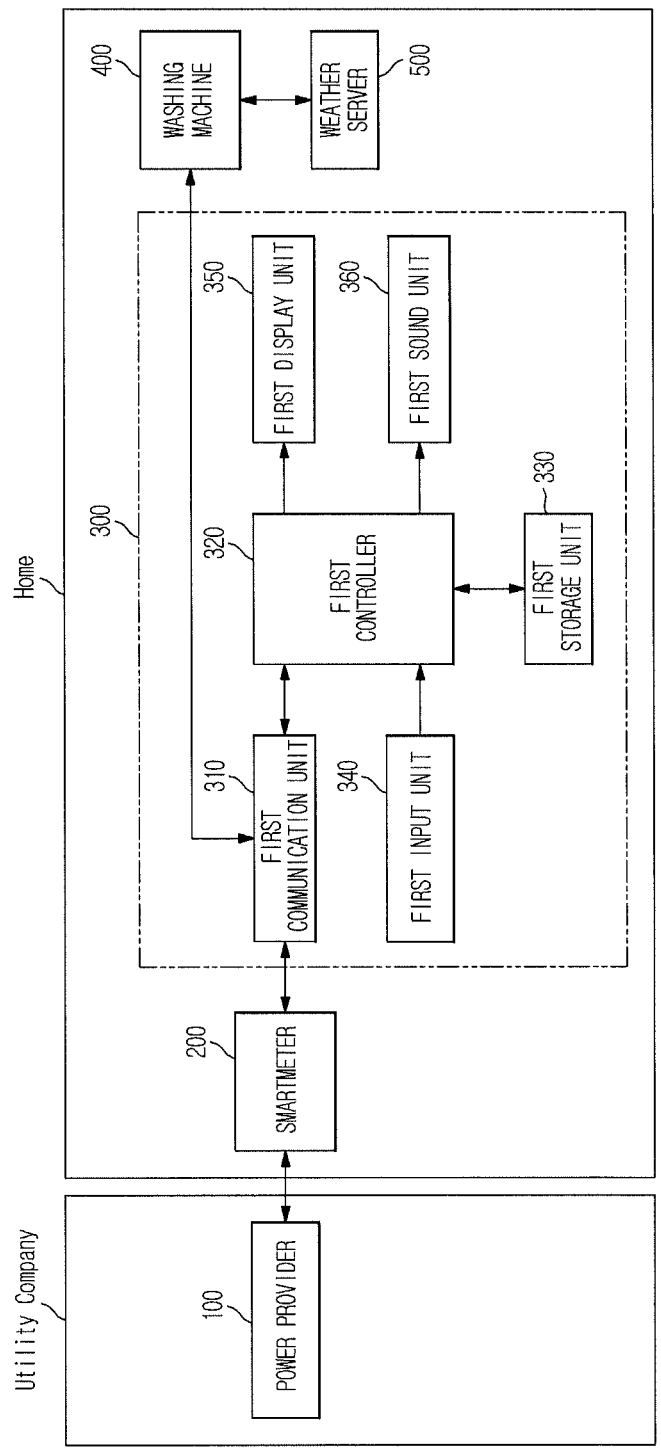
FIG. 1 is a block diagram showing a power management apparatus including a washing machine according to an embodiment.

Reference will now be made in detail to the embodiments, examples of which are illustrated in the accompanying drawings, wherein like reference numerals refer to like elements throughout.

Figure 2:
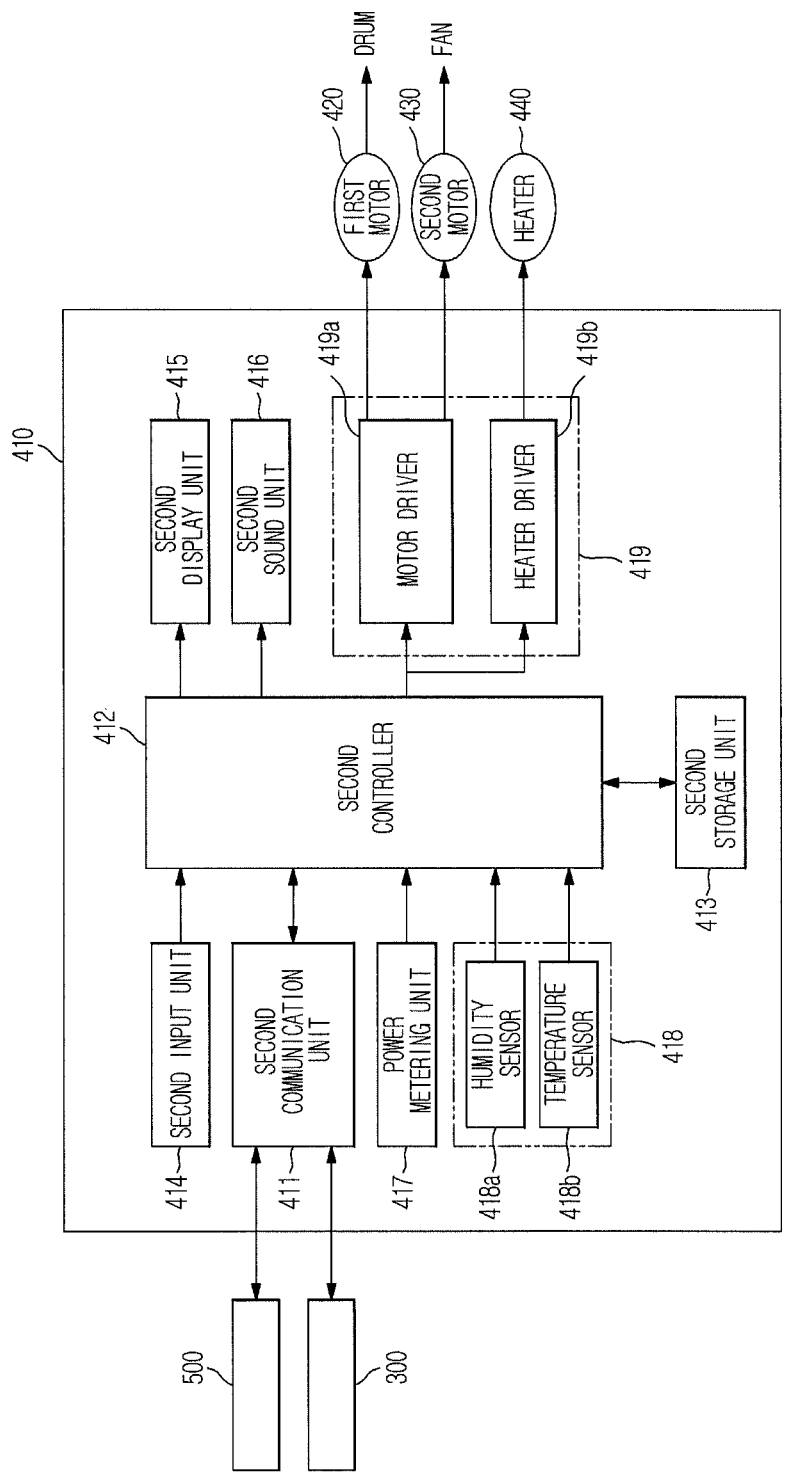
FIG. 2 is a block diagram showing a washing machine according to an embodiment.

FIG. 1 is a block diagram showing a power management apparatus including a washing machine according to an embodiment and FIG. 2 is a block diagram showing a washing machine according to an embodiment.

The power management apparatus including an energy management system (EMS) communicating with a washing machine, as shown in FIG. 1, will now be described.

Referring to FIG. 1, the power management apparatus may include a power provider 100, a smartmeter 200, an EMS 300, a washing machine 400, and a weather server 500.

The power provider 100 is a power supply source that may be driven by a power supply company (utility company) so as to generate and provide power. The power provider 100 may generate the power through atomic energy, hydroelectric power, thermoelectric power, wind power, etc., and provide the generated power to the washing machine 400 and other electric devices installed in each home.

The power provider 100 may predict power consumption on the basis of the generated amount of electric power, the past power use information for every season and every time period, and weather information, and may determine power rates on the basis of the predicted power consumption. In this case, it may also be possible to establish a power rate level corresponding to the predicted power rates as necessary.

The power provider 100 may control power rates of each home to be elastically adjusted in response to power consumption of each home, and provide the adjusted power to each home, such that supply and consumption of power can be balanced.

The power provider 100 may collect power consumption amounts of individual homes classified according to individual power rate levels, and store the collected power consumption information according to individual power rate levels, such that the power supply company may calculate power rates depending upon power consumption for individual power rate levels of each home on a monthly basis, and charge each home the calculated power rates on a monthly basis.

The power provider 100 may compare the periodically calculated power rates with monthly predetermined power rates so as to decide a limited amount of power to be supplied to each home. If the calculated power rates are higher than the monthly predetermined power rates, information about the excess of the monthly predetermined power rates may be transmitted to the EMS 300 installed in the corresponding home, such that an event indicating the excess of monthly predetermined power rates may be generated through the EMS 300 installed in each home.

The power provider 100 may store a monthly threshold power amount for each home for limiting the power supply of each home, compare a monthly power consumption amount for each home with the monthly threshold power amount, and thus decide the limitation of power supply. In this way, the power provider 100 may manage the power demand of each home on the basis of the monthly threshold power amount or the monthly predetermined power rates.

The power provider 100 may be connected to the smartmeter 200, the EMS 300, and the washing machine 400, installed in each home, over a network, such that the power provider 100 may transmit and receive information regarding power demand management over the network. This network may be any of a wired network, a wireless network, a wired/wireless hybrid network, etc.

The smartmeter 200 may be installed in each home and may include a display such as a liquid crystal display (LCD), such that power consumed in each home is displayed in real time. The smartmeter 200 may be an electronic meter, which may bidirectionally communicate with the power provider 100 and the EMS 300 and may transmit the consumed power amount to the power provider 100 and the EMS 300.

The smartmeter 200 may receive power rate information from the power provider 100, display the received power rate information such that users can see the transmitted power rate information and transmit the power rate information to the EMS 300.

In addition, the smartmeter 200 may display power rate levels corresponding to power rates when receiving the power rate levels from the power provider 100, and transmit the power rates and power rate level information to the EMS 300.

The EMS 300 may also be referred to as a Demand Response (DR) controller. The EMS 300 may communicate with the smartmeter 200, and thus receive the power rates and the power rate levels corresponding to the power rates from the smartmeter 200.

In addition, the EMS 300 may communicate with the washing machine 400, and thus receive power consumption information from the washing machine 400 and transmit power rate information to the washing machine 400.

If only power rates are transmitted from the power provider 100, the EMS 300 may decide power rate levels on the basis of the power rates.

In this case, the EMS 300 may receive the power rate information of the power provider 100, provided through the smartmeter 200, at intervals of a unit time and decide rate levels for individual power rates by using the power rate information for each unit time period.

Let us assume that the number of power rate levels is 4 (DR1 to DR4). In more detail, the power rate level DR1 is the lowest power rate level, and the power rate level DR4 is the highest power rate level. Power rate level is proportional to power rate.

The EMS 300 may control the operation of the washing machine 400 on the basis of the power consumption amount of the washing machine 400 and the power rate information of the power provider 100.

The EMS 300 may receive information about excess monthly threshold power and information about excess monthly predetermined power rates from the power provider 100, and inform the user of the received information.

The EMS 300 will now be explained in more detail with reference to FIG. 1.

Referring to FIG. 1, the EMS 300 may include a first communication unit 310, a first controller 320, a first storage unit 330, a first input unit 340, a first display unit 350 and a first sound unit 360.

The first communication unit 310 may communicate with the smartmeter 200, such that it may receive power rate information and power rate level information corresponding to the power rate information from the smartmeter 200 and then may transmit the received information to the first controller 320.

The first communication unit 310 may communicate with the washing machine 400, such that it may receive operation information from the washing machine 400 and then transmit the received operation information to the first controller 320. The first communication unit 310 may receive the power rate information and an operation control signal for the washing machine 400 from the first controller 320 and transmit the received power rate information and operation control signal to the washing machine 400.

When receiving the power rate information from the power provider 100, the first communication unit 310 may be provided with the power rate information daily or in real time.

The first communication unit 310 may transmit power rates for each time period or a power rate level for each time period when transmitting the power rate information to the washing machine 400.

Upon receiving the power rate information daily, the first controller 320 may determine a power rate change period and power rates to be changed on the basis of the daily power rates.

In addition, upon receiving the power rate information in real time, the first controller 320 may predict the future power rates for each time period on the basis of the previously stored past power consumption pattern, and confirm the power rate change period and power rates to be changed on the basis of the predicted future power rates for each time period.

The first controller 320 may control the first display unit 350 and the first sound unit 360 so as to inform the user of the power rate change period and the next power rates to be changed, and transmit the information including the current power rates, the power rate change period, and the next power rates to be changed to the washing machine 400.

In addition, the first controller 320 may directly control the operation of the washing machine 400 on the basis of the information including the current power rates, the power rate change period, and the next power rates to be changed.

More specifically, the first controller 320 may determine a drying operation execution time if operation information transmitted from the washing machine 400 corresponds to a washing operation and a drying operation, and confirm power rates corresponding to the drying operation execution time on the basis of the power rates for each time period. In this case, the first controller 320 may transmit a final spinning mode maintaining command to the washing machine 400 if the confirmed power rates are lower than the standard power rates, and transmit a command for adjusting an algorithm of a final spinning mode in the washing operation to the washing machine 400 if the confirmed power rates are higher than the standard power rates.

Accordingly, the amount of water in washed clothes may be minimized during the final spinning mode, and thus it may be possible to decrease a driving factor or drying operation execution time of the drying operation, thereby possibly reducing power consumption and preventing drying performance deterioration.

The first controller 320 may confirm the temperature and humidity of outside air and calculate suitability of the drying environment before the washing machine 400 enters the final spinning mode if the confirmed power rates are lower than or equal to the standard power rates. The first controller 320 may transmit the final spinning mode maintaining command to the washing machine 400 if the calculated suitability is higher than or equal to a reference value and transmit the command for adjusting the algorithm of the final spinning mode in the washing operation to the washing machine 400 if the calculated suitability is lower than the reference value.

Accordingly, the amount of water in the washed clothes may be minimized during the final spinning mode, and thus it may be possible to prevent the drying operation execution time and power consumption from increasing due to a poor drying environment.

The first controller 320 may also transmit information about a time period corresponding to power rates higher than the standard power rates to the washing machine 400.

The first controller 320 may compare predicted power for each time period with allowable power during the drying operation and transmit the command for adjusting the algorithm of the final spinning mode in the washing operation to the washing machine 400 if the predicted power is higher than the allowable power such that the washing machine 400 can minimize the water amount in the washed clothes in the final spinning mode and perform the drying operation with a reduced driving factor, to thereby prevent the drying level from decreasing and reduce power consumption of the drying operation.

The first storage unit 330 may store user information, and the power rates and power rate level for each time period, and may store reservation information of the washing machine 400 if the reservation information is transmitted from the washing machine 400. Here, the user information may include monthly threshold power, monthly predetermined power rates, allowable power for each time period, and user's personal information.

The first input unit 340 may receive washing operation and drying operation commands for the washing machine 400.

The first display unit 350 may display at least one of the power rates and power rate level for each time period.

The first display unit 350 may display a power rate change period and the next power rate to be changed.

The first input unit 340 and the first display unit 350 may be integrated into a touch screen.

The first sound unit 360 may output final spinning mode adjustment information corresponding to drying operation selection as a sound signal.

The first sound unit 360 may output the power rate change period and the next power rate to be changed as sound signals.

The first sound unit 360 may output information indicating allowable power excess, monthly threshold power excess and monthly predetermined power rate excess as sound signals.

The washing machine 400 may be connected to the EMS 300 through wired or wireless communication such that the washing machine 400 may receive power rate information or an operation command from the EMS 300 through wired or wireless communication, may operate in response to the received information or command and may transmit power consumption information for each operation mode to the EMS 300 in real time.

The configuration of the washing machine 400 will now be explained with reference to FIG. 2.

Referring to FIG. 2, a control device 410 of the washing machine 400 may include a second communication unit 411, a second controller 412, a second storage unit 413, a second input unit 414, a second display unit 415, a second sound unit 416, a power metering unit 417, a sensing unit 418, and a load driver 419.

The second communication unit 411 may communicate with the EMS 300 such that it may transmit operation information to the first communication unit 310 of the EMS 300 according to a command of the second controller 412 and may transmit an operation control signal received from the first communication unit 310 of the EMS 300 to the second controller 412.

The second communication unit 411 may receive power rate information from the EMS 300. Here, the power rate information may include at least one of power rates for each time period and a power rate level for each time period, which corresponds to the power rates for each time period.

In addition, the second communication unit 411 may receive information about an excess time period in which power rates exceed the standard power rates.

The second controller 412 may determine a drying operation execution time if the operation information transmitted from the second input unit 414 corresponds to a washing operation and a drying operation, and may confirm power rates corresponding to the drying operation execution time based on the power rates for each time period. The second controller 412 may control the final spinning mode to be maintained if the confirmed power rates are lower than or equal to the standard power rates, and may control the algorithm of the final spinning mode in the washing operation if the confirmed power rates are higher than the standard power rates.

In addition, the second controller 412 may determine if the drying operation execution time includes the excess time period in which power rates exceed the standard power rates, control the final spinning mode to be maintained if the drying operation execution time does not include the excess time period, and adjust the final spinning mode algorithm if the drying operation execution time includes the excess time period.

Here, controlling the final spinning mode to be maintained may be maintaining a predetermined final spinning mode algorithm which depends on a predetermined washing course.

Adjusting the final spinning mode may be extending a final spinning mode time, increasing a final spinning speed, or repeating the final spinning mode, that is, extending the rotating time of a first motor 420, increasing the rotating speed of the first motor 420 or repeating turning on/off of the first motor 420.

Furthermore, power rates right before the final spinning mode may be compared with the standard power rates.

Accordingly, the amount of water left in the washed clothes can be minimized during the final spinning period so as to reduce the driving factor of the drying operation or shorten the drying operation execution time, resulting in reduction in power consumption and preventing deterioration of drying performance.

The second controller 412 may control an operation of a fan before the washing machine 400 enters the final spinning mode if the confirmed power rates are lower than or equal to the standard power rates, check temperature and humidity sensed when outside air is sucked by the operation of the fan so as to calculate suitability for drying, control the final spinning mode to be maintained if the calculated suitability is higher than or equal to a reference value, and adjust the final spinning mode algorithm if the calculated suitability is lower than the reference value.

In this case, it may also be possible to receive information on the humidity and temperature of the outside air from the weather server 500.

Accordingly, the amount of water left in the washed clothes may be minimized, and thus it is may be possible to prevent the drying operation execution time from increasing due to a poor drying environment and reduce power consumption.

The second controller 412 may calculate a humidity variation (humidity variation rate per unit time) based on the internal humidity of the washing machine 400, sensed by means of a humidity sensor 418a, in case of the drying operation and control the driving factor of the drying operation based on the calculated humidity variation (that is, drying rate).

In addition, the second controller 412 may turn on/off a heater 440 based on exhaust air temperature sensed by means of a temperature sensor 418b.

Controlling the driving factor of the drying operation may include controlling the driving factor of at least one of the heater 440 and a second motor 430.

The second controller 412 may adjust the driving factor if the power rates corresponding to the drying operation are higher than the standard power rates and maintain the driving factor at a predetermined driving factor if the power rates are lower than the standard power rates.

Here, the second controller 412 may compare the power rates with the standard power rates so as to calculate an increase rate and adjust the final spinning mode algorithm based on the calculated increase rate.

When the drying operation is selected, the drying operation execution time may be reduced since the amount of water left in washed clothes may be minimized during the final spinning mode.

However, it may be also possible to control the drying operation execution time when the power rates corresponding to the drying operation are higher than the standard power rates and to maintain the drying operation execution time at a predetermined time period when the power rates are lower than the standard power rates.

The second storage unit 413 stores the power rates for each time period and the standard power rates.

The second storage unit 413 may store information about an excess time period in which power rates exceed the standard power rates due to a spike in power consumption.

In addition, the second storage unit 413 may store at least one of the final spinning speed, the final spinning time and the number of repeated final spinning modes, which correspond to the power rate increase rate, and may store the driving factor corresponding to the drying operation.

The second input unit 414 may receive washing operation and drying operation commands or information on washing operation and drying operation reservation time from the user and transmit the received data to the second controller 412.

The second display unit 415 may display the power rates for each time period and the power rate level for each time period.

The second display unit 415 may display the power rate excess time period.

In addition, the second display unit 415 may display the status of the washing operation and drying operation.

The second input unit 414 and the second display unit 415 may be integrated into a touch screen.

The second sound unit 416 may output power rate variation as a sound signal, output information indicating adjustment of the final spinning mode algorithm as a sound signal when the final spinning mode algorithm has been adjusted, and output the start time and type of the washing operation and drying operation as sound signals.

The power metering unit 417 may meter the power amount consumed by the washing machine 400 in real time and transmit the metered power amount to the second controller 412 such that the actual power amount consumed by the washing machine 400 can be detected and the power consumption amount stored in the second storage unit 413 can be updated.

The power metering unit 417 may meter power using a voltage across AC power lines connected to a power cord (not shown) of the washing machine 400 and current detected from one of the AC power lines connected to the power connector.

The sensing unit 418 may include the humidity sensor 418a that senses the internal humidity of the washing machine 400 and the temperature sensor 418b that senses the temperature of exhaust air of the washing machine 400.

Here, the humidity sensor 418a may generate an electric signal corresponding to the quantity of water in the washing machine 400. Accordingly, the drying rate of a dried object can be determined.

The load driver 419 may include a motor driver 419a which may drive the first motor 420 and the second motor 430 and a heater driver 419b which may drive the heater 440 under the control of the second controller 412.

Here, the first motor 420 may rotate a drum such that the washing operation and drying operation including a mode of sensing the quantity of washed clothes, a washing mode, a rinsing mode, an intermediate spinning mode, the final spinning mode, etc. may be performed.

The second motor 430 may rotate the fan to circulate the air in the drum during the drying operation.

The heater 440 may heat the air in the drum during the drying operation.

The power consumption amount and instantaneous power amount of the washing operation may be equal to or smaller than half of the power consumption amount and instantaneous power amount of the drying operation, in general, and thus power consumption of the drying operation can be reduced by varying the final spinning mode algorithm in a high power rate state.

Particularly, power consumption of the first motor 420 may correspond to ⅕th or 1/10th of power consumption of the drying operation, and thus water can be removed from the washed clothes with a power consumption amount smaller than that of the drying operation by increasing the final spinning mode time or repeating the final spinning mode.

The weather server 500 may store the current temperature and humidity data and transmit the stored data to the EMS 300 and the washing machine 400.

The weather server 500 may transmit information to the EMS 300 or the washing machine 400 in response to an information request signal when the information request is transmitted thereto from the EMS 300 or the washing machine 400.

Figure 3:
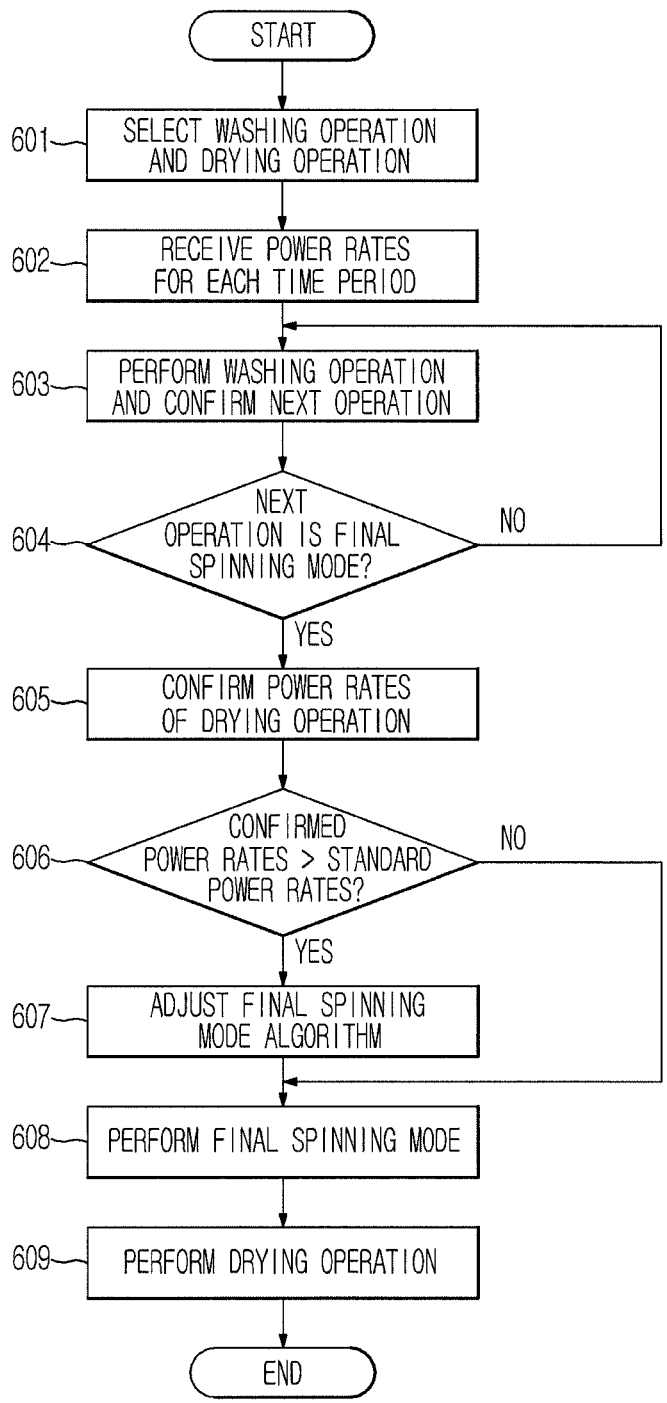
FIG. 3 is a flowchart illustrating a method for controlling a washing machine according to an embodiment.

FIG. 3 is a flowchart illustrating a method of controlling the washing machine 400 according to an embodiment. The method of controlling the washing machine 400 will now be explained with reference to FIGS. 3 to 6.

When the user selects a washing operation, the washing machine 400 may determine whether a drying operation is selected.

When the washing operation and the drying operation are selected (601), the washing machine 400 may receive information about the power rates for each time period from the EMS 300 (602) and store the received information. Here, the washing machine 400 may receive the information about the power rates before entering the final spinning mode.

The washing machine 400 may start the washing operation and confirm the next mode while performing the washing operation (603).

Here, the washing machine 400 may check whether the next mode is the final spinning mode (604), determine a drying operation execution time before entering the final spinning mode if the next mode corresponds to the final spinning mode, and confirm power rates corresponding to the drying operation execution time based on the power rates for each time period (605).

The washing machine 400 may determine whether the drying operation execution time includes a time period corresponding to power rates higher than the standard power rates (606).

The washing machine 400 may adjust the final spinning mode algorithm if the drying operation execution time includes the time period corresponding to power rates higher than the standard power rates (607) and then may perform the final spinning mode (608), and perform the drying operation when the final spinning mode is finished (609).

The operation of adjusting the final spinning mode algorithm will now be explained with reference to FIGS. 4 and 5.

Figure 4:
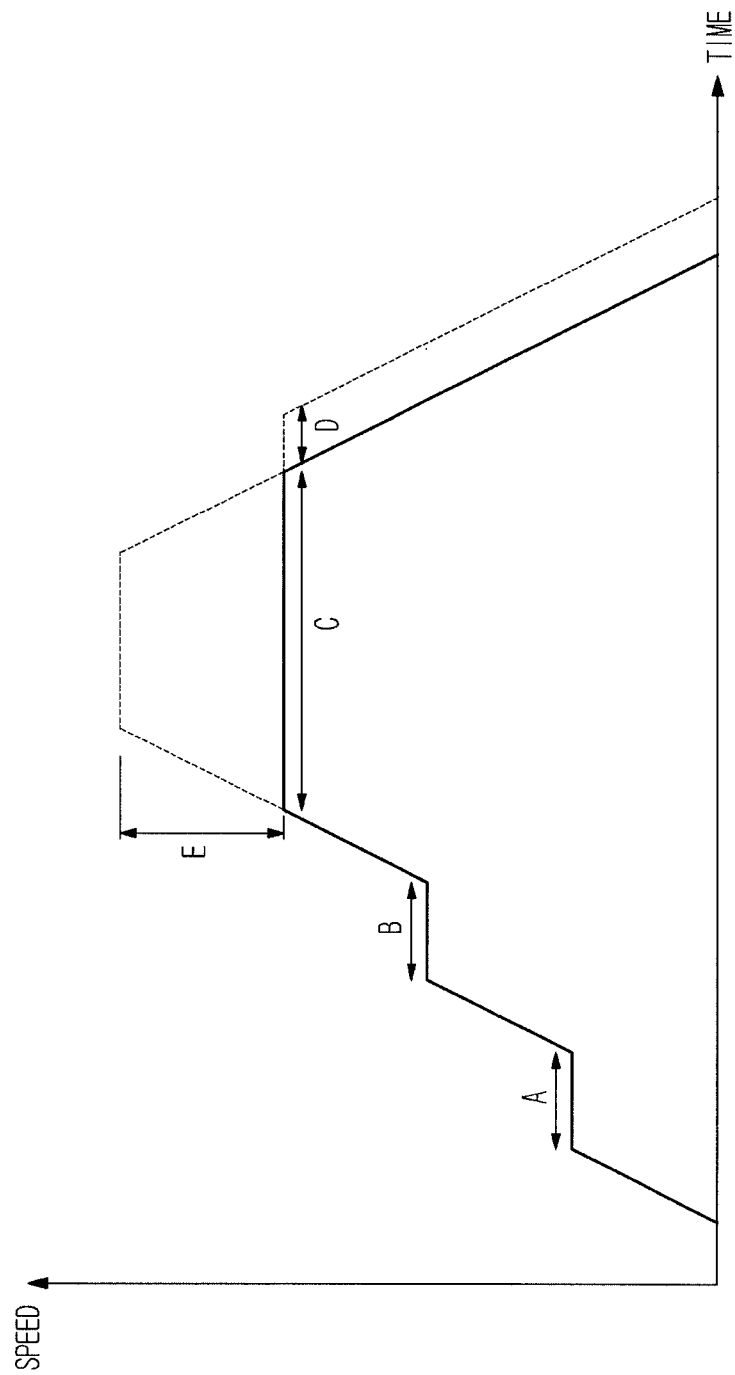
FIGS. 4 and 5 are graphs showing a final spinning speed for each time period in a washing machine according to an embodiment.

FIG. 4 is a graph showing the relationship between the rotating speed of the first motor and time in case of the final spinning mode.

Referring to FIG. 4, the speed of the first motor 420 may be increased in stages and a target speed may be maintained for a predetermined time C when the speed of the first motor 420 has reached the target speed during the final spinning mode. Here, the predetermined time C in which the target speed is maintained may be extended such that as much of the water absorbed in washed clothes as possible can be discharged.

Furthermore, in the operation of increasing the speed of the first motor in stages, at least one of speed maintaining time periods A and B in which the speed of the first motor 420 is maintained may be extended such that as much of the water absorbed in the washed clothes as possible can be discharged.

Moreover, the target speed of the first motor 420 may be increased by a predetermined level E during the final spinning mode so as to increase centrifugal force according to the increase in the speed of the first motor 420 such that as much as the water absorbed in the washed clothes as possible can be discharged.

Figure 5:
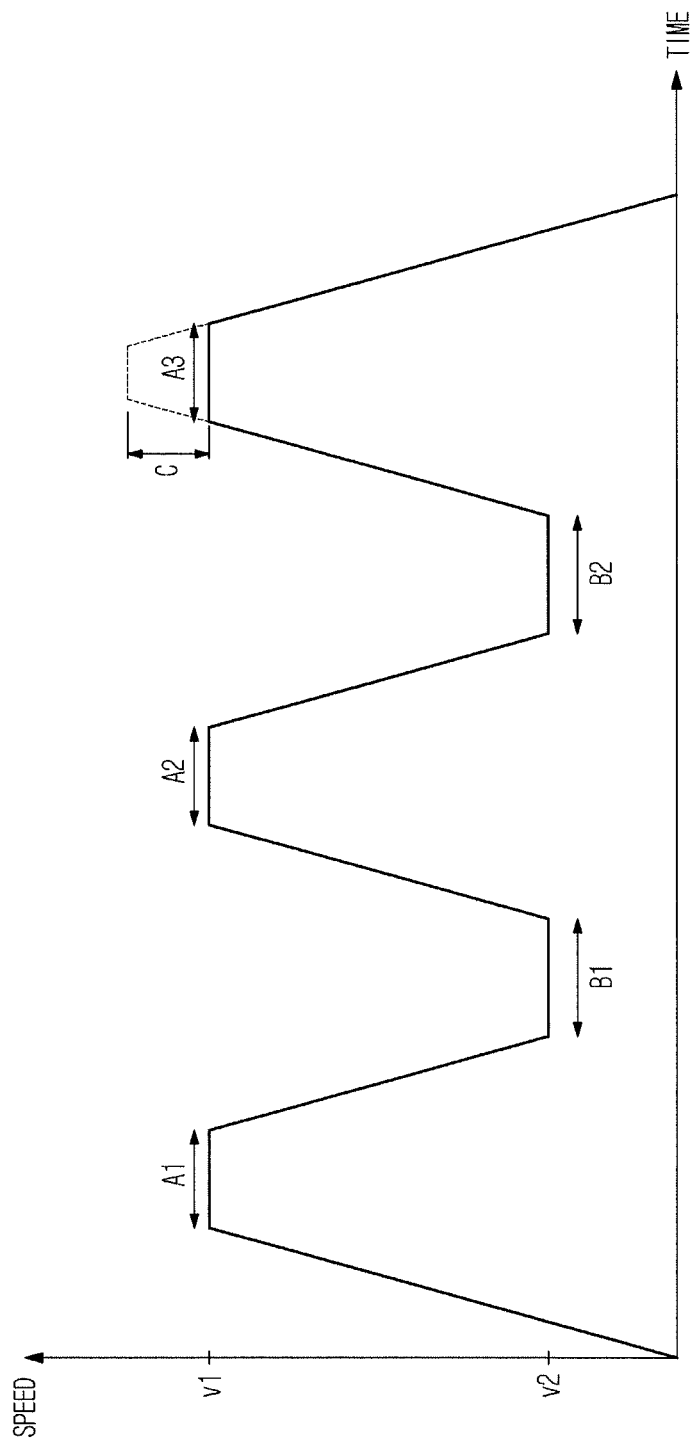

FIG. 5 is a graph showing the relationship between the rotating speed of the first motor and time in case of the final spinning mode.

Referring to FIG. 5, the speed of the first motor 420 may be increased to a first target speed V1 and then decreased to a second target speed V2 such that washed clothes are uniformly distributed during the final spinning mode. Then, the speed of the first motor 420 may be again increased to the first target speed V1 and spinning may be performed such that a water-absorbing face and a water-discharging face are changed so as to increase the force of discharging water from the water-absorbing face. In this manner, the speed of the first motor 420 may be repeatedly increased and decreased to remove as much water as possible from the washed clothes.

In addition, to remove as much water as possible from the washed clothes, it may also be possible to extend at least one of first maintaining time periods A1, A2 and A3 in which the first target speed V1 of the first motor 420 is maintained while repeatedly increasing and decreasing the speed of the first motor 420 or to raise the first target speed V1 by a predetermined level C.

Moreover, it may also be possible to increase the number of spinning modes.

As described above, the quantity of water in the washed clothes can be minimized by adjusting the final spinning mode algorithm so as to decrease the driving factor during the drying operation or reduce the drying operation execution time. Accordingly, power consumption of the drying operation can be reduced and drying performance deterioration can be prevented.

Meanwhile, the washing machine 400 may maintain the predetermined final spinning mode algorithm and perform the final spinning mode according to the predetermined spinning mode algorithm if the overall power rates during the drying operation execution time are lower than the standard power rates (609).

Figure 6:
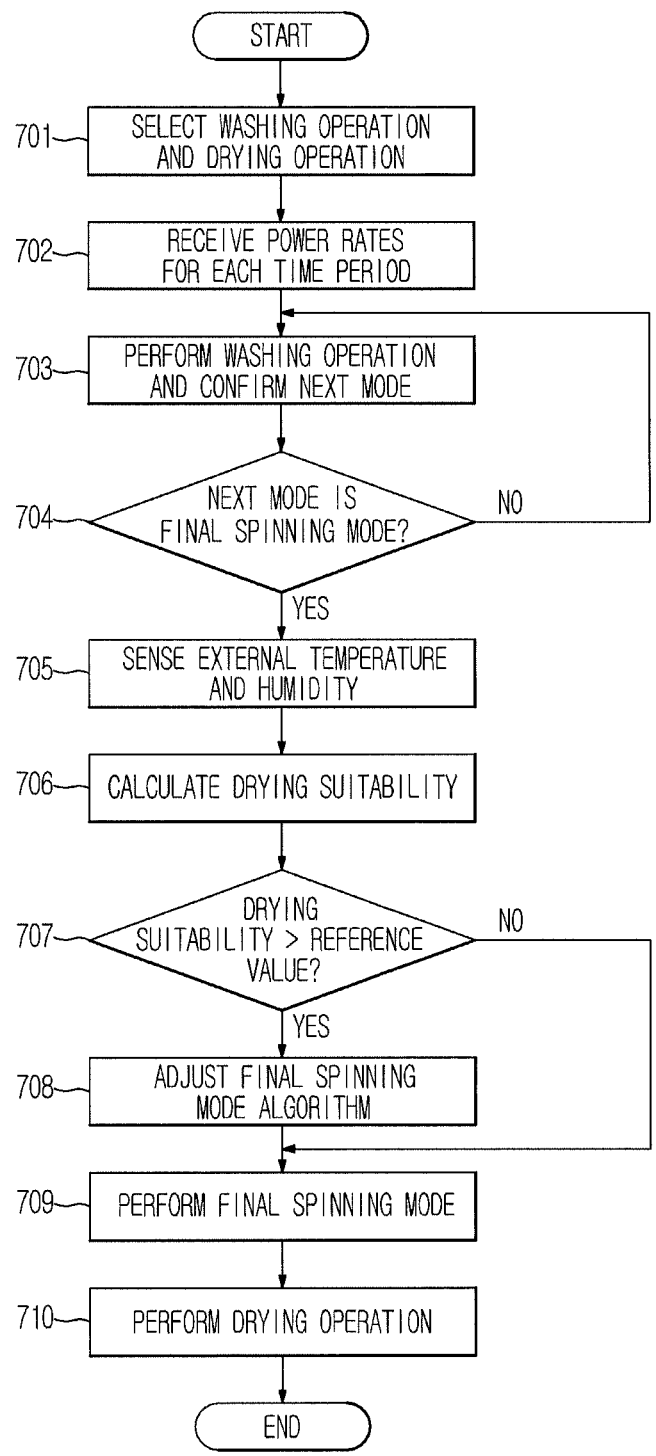
FIG. 6 is a flowchart illustrating a method for controlling a washing machine according to an embodiment.

In addition, it may also be possible to adjust the final spinning mode algorithm based on a drying environment in a state that the overall power rates during the drying operation execution time are lower than or equal to the standard power rates, which is explained with reference to FIG. 6.

The washing machine 400 may determine whether a drying operation is selected when the user selects a washing operation.

At this time, the washing machine 400 may receive information on the power rates for each time period from the EMS 300 (702) when the washing operation and the drying operation are selected (701), and store the received information. Here, the washing machine 400 may also receive the information on the power rates before entering the final spinning mode.

The washing machine 400 may start the washing operation and confirm the next mode while performing the washing operation (703).

The washing machine 400 may determine if the next mode is the final spinning mode (704), determine a drying operation execution time in which the drying operation is performed before entering the final spinning mode when the next mode is the final spinning mode, and confirm the power rates corresponding to the drying operation execution time based on the power rates for each time period.

The washing machine 400 may determine whether the drying operation execution time includes a time period corresponding to power rates higher than the standard power rates.

The washing machine 400 may control the operation of the fan before entering the final spinning mode if the overall power rates during the drying operation execution time are lower than or equal to the standard power rates and senses the temperature and humidity of outside air sucked by the fan (705).

In addition, the washing machine 400 may receive temperature and humidity information from the weather server 500 or the EMS 300.

Subsequently, the washing machine 400 may determine the drying environment based on the temperature and humidity, calculate suitability for drying, which determines a drying level suitable for the determined drying environment (706), and compare the calculated suitability with a reference value (707).

If the calculated suitability is higher than or equal to the reference value, the washing machine 400 may maintain the final spinning mode algorithm as the predetermined algorithm and perform the final spinning mode according to the predetermined algorithm.

On the other hand, if the calculated suitability is lower than the reference value, the washing machine 400 may adjust the final spinning mode algorithm (708) and perform the final spinning mode according to the adjusted algorithm (709.). Here, the final spinning mode algorithm may be adjusted in the same manner as described with reference to FIGS. 4 and 5.

As described above, it may be possible to prevent the drying operation execution time and power consumption from increasing due to poor drying environment by minimizing the amount of water in the washed clothes during the final spinning mode.

Upon finishing the final spinning mode, the washing machine 400 may perform the drying operation (710).

In the drying operation, the washing machine 400 may calculate a humidity variation (humidity variation rate per unit period: drying rate) based on the internal humidity of the washing machine 400, sensed by the humidity sensor 418*a*, and perform the drying operation while controlling the driving factor of the drying operation according to the calculated humidity variation (that is, drying rate).

Here, controlling the driving factor of the drying operation comprises controlling the driving factor of at least one of the heater 440 and the second motor 430.

While the drying operation execution time is reduced since the amount of water in the washed clothes is minimized in the final spinning mode, it may also be possible to adjust both the final spinning mode algorithm and the drying operation execution time if the power rates during the drying operation become higher than the standard power rates.

In addition, the washing machine 400 may receive information about an excess time period corresponding to power rates higher than the standard power rates.

At this time, the washing machine 400 may confirm whether the drying operation execution time includes the excess time period, maintain the final spinning mode as the predetermined algorithm if the drying operation execution time does not include the excess time period, and adjust the final spinning mode algorithm if the drying operation execution time includes the excess time period.

Here, maintaining the final spinning mode includes maintaining the final spinning mode as the predetermined algorithm which depends on a washing course.

Adjusting the final spinning mode may correspond to one of extending the final spinning mode time, increasing the final spinning speed and repeating the final spinning mode, that is, extending the rotating time of the first motor 420, increasing the rotating speed of the first motor 420 and repeatedly turning the first motor 420 on/off.

Furthermore, it may be possible to compare power rates right before the washing machine 400 enters the final spinning mode with the standard power rates.

As described above, the amount of water in the washed clothes can be minimized during the final spinning mode so as to reduce the driving factor of the drying operation or shorten the drying operation execution time, thereby reducing power consumption and preventing drying performance deterioration.

Figure 7:
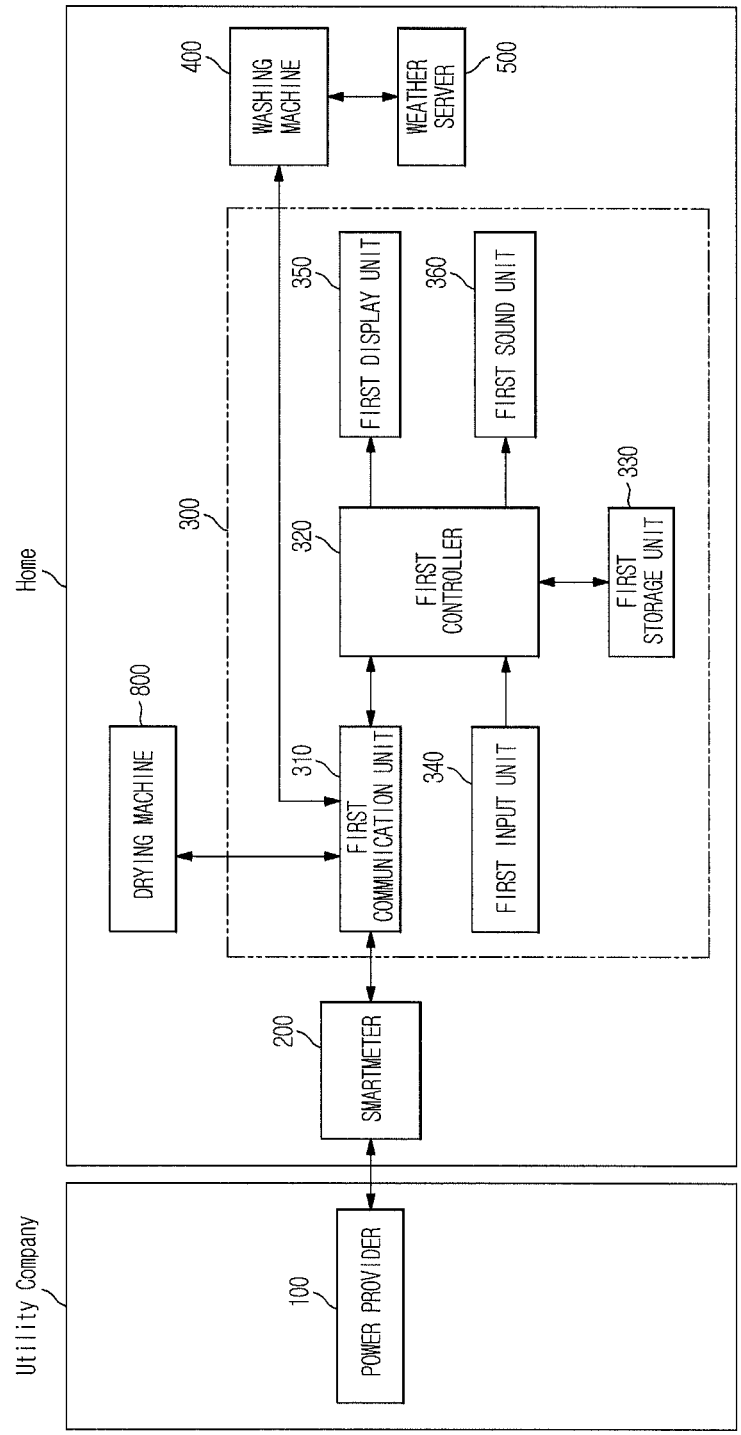
FIG. 7 is a block diagram showing a power management apparatus including a washing machine according to another embodiment.
Figure 8:
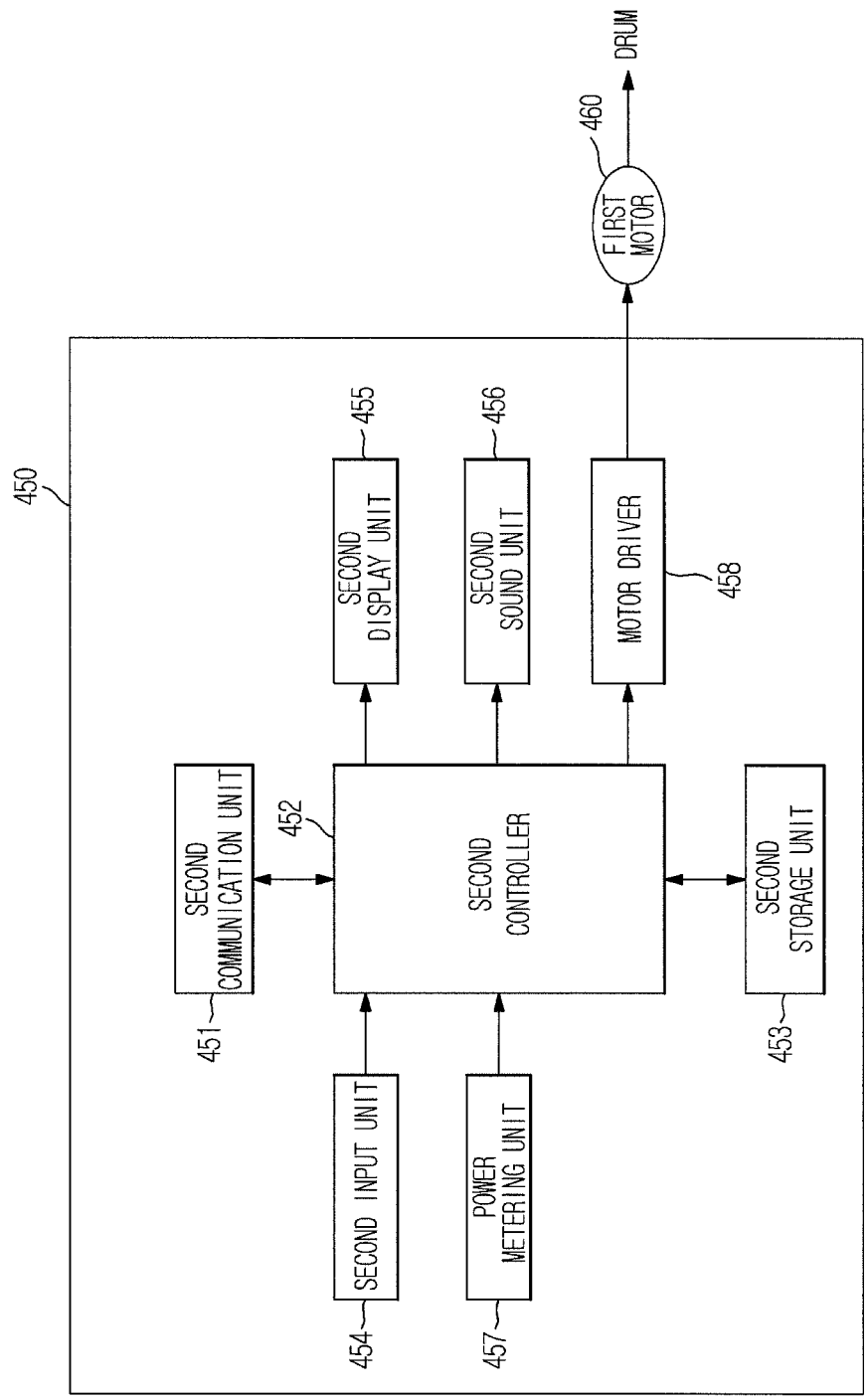
FIG. 8 is a block diagram showing a washing machine according to another embodiment.
Figure 9:
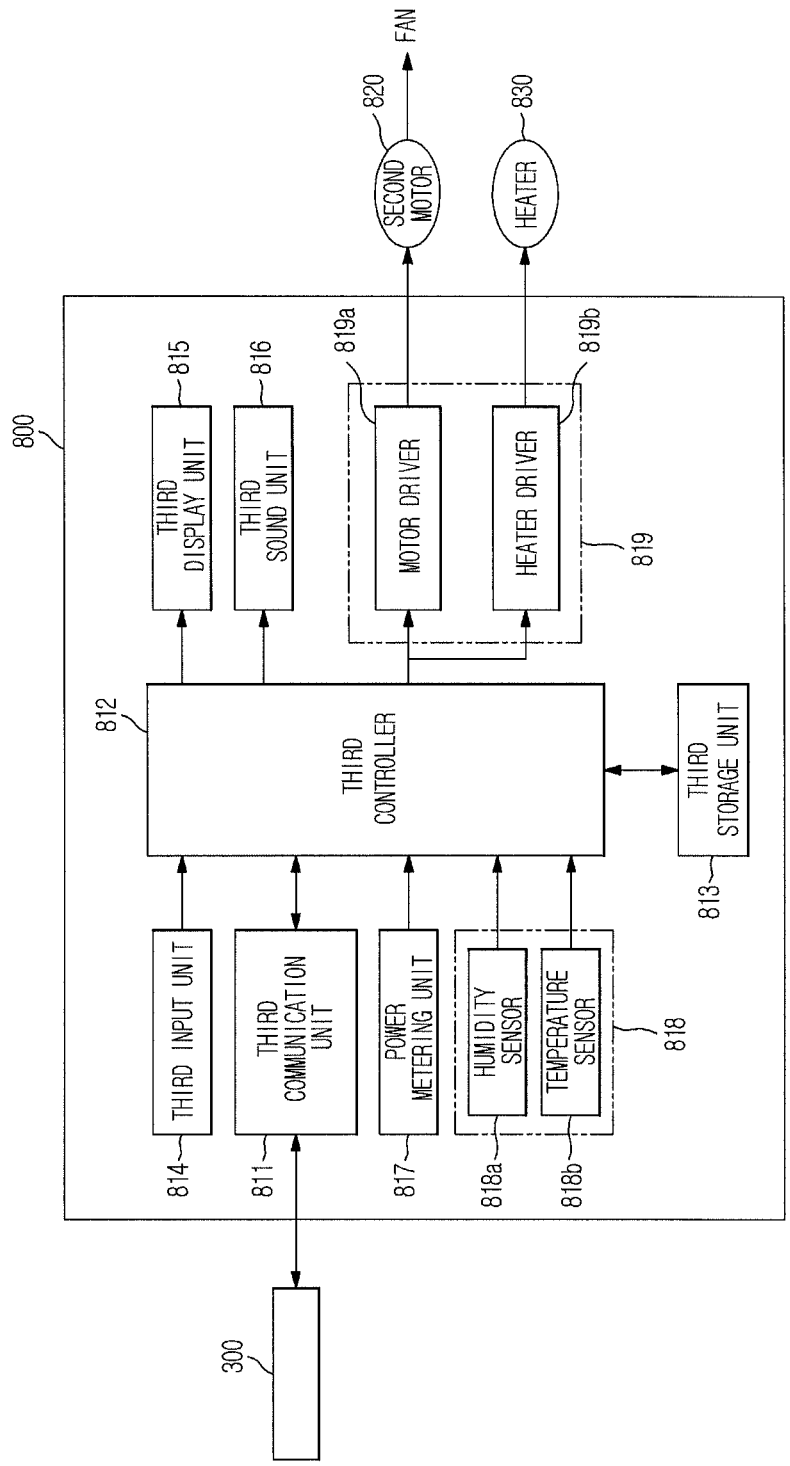
FIG. 9 is a block diagram showing a drying machine according to another embodiment.

FIG. 7 is a block diagram of a power management apparatus including the washing machine 400 and a drying machine 800 according to another embodiment, FIG. 8 is a block diagram of the washing machine according to another embodiment, and FIG. 9 is a block diagram of the drying machine according to another embodiment.

The EMS 300, the smartmeter 200 and the weather server 500 included in the power management apparatus according to another embodiment of the present invention may be identical to those of the power management apparatus according to an embodiment and, as such, explanations thereof are omitted.

While the washing machine 400 and the drying machine 800 are separated from each other in this embodiment, the washing machine 400 and the drying machine 800 may be constructed in a two-tub structure.

Referring to FIG. 7, the EMS 300 may include the first communication unit 310, the first controller 320, the first storage unit 330, the first input unit 340, the first display unit 350, and the first sound unit 360.

The first display unit 350 and first sound unit 360 of the EMS 300 included in the power management apparatus according to another embodiment may be identical to those of the EMS of the power management system according to the above embodiment of the present invention and, as such, explanations thereof are omitted.

The first communication unit 310 may communicate with the washing machine 400 such that it receives operation information from the washing machine 400 and the drying machine 800, transmit the received operation information to the first controller 320, and transmit power rate information for each time period to the washing machine 400 and the drying machine 800.

The first communication unit 310 may receive a washing machine operation control signal and transmit the operation control signal to the washing machine 400. In addition, the first communication unit 310 may receive a drying machine operation control signal and transmit the operation control signal to the drying machine 800.

That is, the first controller 320 may directly control operations of the washing machine 400 and the drying machine 800 based on information such as the current power rates, a power rate change time period, and the next power rates to be changed, etc.

The first controller 320 may determine whether a drying operation selection signal is input from the drying machine 800 when a washing operation of the washing machine 400 is selected, and determine a washing operation end time or a drying operation start time when the drying operation of the drying machine 800 is selected in a state in which the washing operation of the washing machine 400 has been selected. The first controller 320 may determine a drying operation execution time based on the determination result and confirm power rates corresponding to the drying operation execution time based on the power rate information for each time period.

Here, the first controller 320 may transmit a final spinning mode algorithm adjustment command to the washing machine 400 if the power rates corresponding the drying operation execution time are higher than the standard power rates and transmit a final spinning mode maintaining command to the washing machine 400 if the power rates corresponding drying operation execution time are lower than the standard power rates.

In addition, the first controller 320 may inform the user of the power rates for each time period and whether the drying operation of the drying machine 800 is performed when a washing operation selection signal is input from the washing machine 400. That is, the first controller 320 may provide only information to the washing machine 400 and may not perform operation control.

The first controller 320 may transmit information about an excess time having power rates higher than the standard power rates to the washing machine 400 when the drying operation of the drying machine 800 is selected.

The first storage unit 330 may store user information, the power rates for each time period and power rate levels. In addition, the first storage unit 330 may store reservation information of the washing machine 300 when receiving the reservation information from the washing machine 400 and store reservation information of the drying machine 800 when receiving the reservation information from the drying machine 800. Accordingly, information about power rates can be transmitted to the corresponding machine at the corresponding reservation time.

The first input unit 340 may receive a washing operation command for the washing machine 400 and a drying operation command of the drying machine 800.

The washing machine 400 may be connected to the EMS 300 through wired or wireless communication such that it receives power rate information or an operation command transmitted from the EMS 300, operates in response to the received information or command, and transmits power consumption information for each operation mode to the EMS 300 in real time.

The configuration of the washing machine 400 will now be explained with reference to FIG. 8.

Referring to FIG. 8, a control device 450 of the washing machine 400 may include a second communication unit 451, a second controller 452, a second storage unit 453, a second input unit 454, a second display unit 455, a second sound unit 456, a power metering unit 457 and a motor driver 458.

The second communication unit 451 may communicate with the EMS 300 such that the second communication unit 451 transmits operation information to the first communication unit 310 of the EMS 300 according to a command of the second controller 452 and transmits an operation control signal received from the first communication unit 310 of the EMS 300 to the second controller 452.

The second communication unit 451 may receive power rate information from the EMS 300. Here, the power rate information may include at least one of power rates for each time period and a power rate level corresponding to the power rates for each time period.

In addition, the second communication unit 451 may receive information about an excess time having power rates higher than the standard power rates.

Upon receiving the washing operation selection signal from the second input unit 454, the second controller 452 may determine whether a drying operation selection signal is received through the second communication unit 451. The second controller 454 may determine a drying operation execution time when the drying operation selection signal is input through the second communication unit 451 and determine whether the power rates during the drying operation execution time exceed the standard power rates based on the power rates for each time period.

Here, the second controller 452 may determine whether the power rates during the drying operation execution time are higher than the standard power rates before the washing machine 400 enters the final spinning mode.

The second controller 452 may control the final spinning mode to be maintained as a predetermined algorithm if the final spinning mode execution time does not include a time period corresponding to power rates lower than or equal to the standard power rates and adjust the algorithm of the final spinning mode in the washing operation if the final spinning mode execution time includes a time period corresponding to power rates higher than the standard power rates.

Here, maintaining the final spinning mode may include maintaining the final spinning mode as the predetermined algorithm which depends on a washing course.

Adjusting the final spinning mode may include one of extending the final spinning mode time, increasing the final spinning speed and repeating the final spinning mode, that is, extending the rotating time of a first motor 460, increasing the rotating speed of the first motor 460 and repeatedly increasing and decreasing of the rotating speed.

Accordingly, the amount of water in washed clothes can be minimized during the final spinning mode so as to decrease the driving factor of the drying operation or the drying operation execution time, thereby reducing power consumption and preventing drying performance deterioration.

The second controller 452 may control the operation of a fan before the washing machine 400 enters the final spinning mode if the drying operation execution time does not include a time period corresponding to power rates higher than the standard power rates, and confirm the temperature and humidity of outside air sucked by the fan to calculate suitability for drying. The second controller 452 may maintain the final spinning mode if the calculated suitability is higher than or equal to a reference value and adjust the final spinning mode algorithm if the calculated suitability is lower than the reference value.

Here, information on the temperature and humidity of the outside air may be transmitted from the weather server 500.

Accordingly, it may be possible to prevent the drying operation execution time and power consumption from increasing due to poor drying environment since the amount of water in the washed clothes is minimized during the final spinning mode.

The second controller 452 may transmit a washing operation completion signal to the drying machine 800 through the EMS 300 such that the drying machine 800 starts the drying operation. In addition, the second controller 452 may directly transmit the washing operation completion signal to the drying machine 800.

The second storage unit 453 may store the power rates for each time period and the standard power rates.

The second storage unit 453 may store information about an excess time period in which power rates become higher than or equal to the standard power rates due to a spike in power consumption.

The second storage unit 453 may store at least one of the final spinning speed, the final spinning time and the final number of repeated spinning operations corresponding to an increase rate of power rates.

The second input unit 454 may receive a washing operation command or information about a washing operation reservation time from the user and transmit the received data to the second controller 452.

In addition, the second input unit 454 may receive information on a drying operation reservation time.

The second display unit 455 may display the power rates for each time period or the power rate level for each time period.

The second display unit 455 may display a power rate excess time.

The second display unit 455 may display the status of the washing operation.

The second input unit 454 and the second display unit 455 may be integrated into a touch screen.

The second sound unit 454 may output a power rate variation as a sound signal, output information indicating adjustment of the final spinning mode as a sound signal, and output information about the start time and type of the washing operation as sound signals.

The power metering unit 457 may meter a power amount consumed by the washing machine 400 in real time and transmit the metered power amount to the second controller 452 such that the actual power amount consumed by the washing machine 400 can be detected and power consumption amount stored in the second storage unit 453 can be updated.

A motor driver 458 may drive the first motor 460 in response to an instruction from the second controller 452.

Here, the first motor 460 may rotate a drum of the washing machine 400 such that the washing operation and the drying operation including a mode of detecting the quantity of clothes, a rinsing mode, and intermediate spinning mode, the final spinning mode, etc. are performed.

The drying machine 800 may be connected to the EMS 300 through wired or wireless communication such that the drying machine 800 receives power rate information or an operation command transmitted from the EMS 300 through wired or wireless communication, operates in response to the received information or command and transmits power consumption information for each operation mode to the EMS 300 in real time.

The configuration of the drying machine 800 is described with reference to FIG. 9.

Referring to FIG. 9, the drying machine 800 may include a third communication unit 811, a third controller 812, a third storage unit 813, a third input unit 814, a third display unit 815, a third sound unit 816, a power metering unit 817, a sensing unit 818, and a load driver 819.

The third communication unit 811 may communicate with the EMS 300 so as to transmit operation information to the first communication unit 310 of the EMS 300 in response to an instruction of the third controller 812 and send an operation control signal transmitted from the first communication unit 310 of the EMS 300 to the third controller 812.

The third communication unit 811 may receive power rate information from the EMS 300. Here, the power rate information may include at least one of power rates for each time period and a power rate level corresponding to the power rates for each time period.

In addition, the third communication unit 811 may receive information about an excess time during which power rates are higher than the standard power rates.

When a drying operation selection signal is input from the third input unit 814, the third controller 812 may transmit the drying operation selection signal to the EMS 300 through the third communication unit 811. When a washing operation completion signal is input through the third communication unit 811, the third controller 812 may decide a drying operation execution time and determine whether the power rates corresponding to the drying operation execution time are higher than the standard power rates based on the power rates for each time period.

The third controller 812 may control the drying operation at a predetermined driving factor if the final spinning mode execution time does not include a time period corresponding to power rates lower than or equal to the standard power rates and may adjust the driving factor of the drying operation if the final spinning mode execution time includes a time period corresponding to power rates higher than the standard power rates.

Here, adjusting the driving factor of the drying operation may include decreasing the driving factor of at least one of a heater 830 and a second motor 820.

That is, it may be possible to prevent drying performance deterioration even when the driving factor of the drying operation or the drying operation execution time is reduced since the amount of water in the washed clothes is minimized during the final spinning mode.

The third controller 812 may control the operation of the second motor 820 before the drying machine 800 enters the final spinning mode if the drying operation execution time does not include a time period corresponding to power rates higher than the standard power rates. At this time, the third controller 812 may control the operation of the sensing unit 818 so as to confirm the temperature and humidity sensed by the sensing unit 818.

The third controller 812 may calculate suitability for drying based on the temperature and humidity, compare the calculated suitability with a reference value and transmit the comparison result to the washing machine 400 through the EMS 300.

The third controller 812 may calculate humidity variation (humidity variation rate per predetermined time period: drying rate) based on the internal humidity of the washing machine 400, sensed by means of a humidity sensor 818a, and control the driving factor of the drying operation according to the calculated humidity variation (that is, drying rate).

Furthermore, the third controller 812 may turn the heater 830 on/off according to an exhaust temperature sensed by a temperature sensor 818b.

The third storage unit 813 may store the power rates for each time period and the standard power rates.

The third storage unit 813 may store information about an excess time period in which power rates become higher than or equal to the standard power rates due to a spike in power consumption.

The third storage unit 813 may store driving factors of the second motor 820 and the heater 830, which correspond to a power rate increasing rate.

The third input unit 814 may receive a drying operation command or information about a drying operation reservation time from the user and transmit the received command or information to the third controller 812.

The third input unit 814 may receive the driving factor of the drying operation. Here, when the driving factor of the drying operation is input by the user, the third controller 814 may adjust the drying operation at the input driving factor.

The third display unit 815 may display the power rates for each time period or the power rate level for each time period.

The third display unit 815 may display a power rate excess time period.

The third display unit 815 may display the status of the drying operation.

The third input unit 814 and the third display unit 815 may be integrated into a touch screen.

The third sound unit 816 may output a power rate variation as a sound signal, output information indicating adjustment of the final spinning mode as a sound signal, and output the start time and type of the washing operation as sound signals.

The power metering unit 817 may meter a power amount consumed by the drying machine 800 in real time and transmit the metered power amount to the third controller 812 such that the actual power amount consumed by the drying machine 800 can be detected and power consumption amount stored in the third storage unit 813 can be updated.

The sensing unit 818 may include the humidity sensor 818a that may sense the internal humidity of the drying machine 800 and the temperature sensor 818b that may sense the temperature of air discharged from the drying machine 800.

Here, the humidity sensor 818a may generate an electric signal corresponding to the quantity of water in the drying machine 800 such that the drying rate of a dried object can be determined from the electric signal.

The load driver 819 may include a motor driver 819a that may drive the second motor 820 in response to an instruction of the third controller 812 and a heater driver 819*b* that may drive the heater 830 in response to an instruction of the third controller 812.

Here, the second motor 820 may rotate the fan in the drying operation so as to circulate the air in the drum and the heater 830 may heat the air in the drum in the drying operation.

Figure 10:
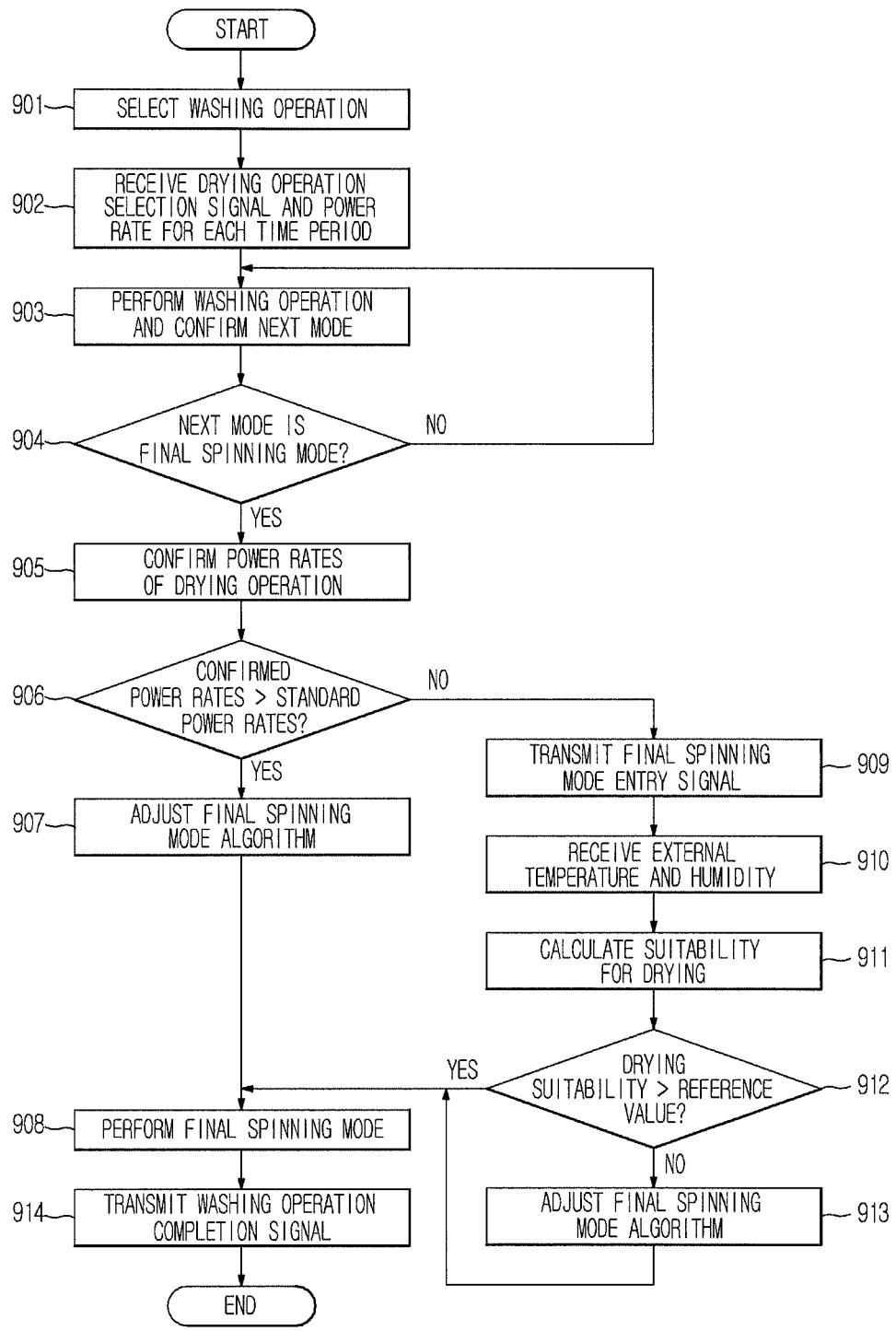
FIG. 10 is a flowchart illustrating a method for controlling a washing machine according to another embodiment.

FIG. 10 is a flowchart illustrating a method of controlling the washing machine according to another embodiment.

The washing machine 400 may determine whether a drying operation is selected when the user selects a washing operation.

Here, the washing machine 400 may transmit a washing operation selection signal to the EMS 300 when the washing operation is selected (901).

The washing machine 400 may determine whether a drying operation of the drying machine 800 is selected from the EMS 800, receive a drying operation selection signal of the drying machine 800 and power rates for each time period from the EMS 300 if the drying operation of the drying machine 800 is selected (902), and store the received power rates for each time period and drying operation information. Here, the power rates may be received before the washing machine 400 enters the final spinning mode.

Then, the washing machine 400 may start the washing operation and confirm the next mode while performing the washing operation (903).

At this time, the washing machine 400 may check whether the next mode is the final spinning mode (904), determine a drying operation execution time before entering the final spinning mode when the next mode corresponds to the final spinning mode, and confirm power rates corresponding to the drying operation execution time based on the power rates for each time period (905).

The washing machine 400 may determine whether the drying operation execution time includes a time period corresponding to power rates higher than the standard power rates (906).

The washing machine 400 may adjust the final spinning mode algorithm (907) if the drying operation execution time includes the time period corresponding to power rates higher than the standard power rates and perform the final spinning mode according to the adjusted final spinning mode algorithm (908).

Here, the final spinning mode algorithm may be adjusted in such a manner that the target speed of the first motor 420 is increased or the target speed maintaining time is extended, as shown in FIGS. 4 and 5, such that as much of water as possible absorbed in washed clothes can be discharged.

Furthermore, when the speed of the first motor 420 is increased in stages, at least one of time periods in which the speed of the first motor 420 is maintained may be extended at each stage so as to allow as much of the water as possible absorbed in the washing clothes to be discharged.

In this manner, as much water as possible may be removed from the washed clothes by repeatedly increasing and decreasing the speed of the first motor 420.

In addition, it may also be possible to extend at least one of the first time periods A1, A2 and A3 in which the first target speed V1 of the first motor 420 is maintained while repeatedly increasing and decreasing the speed of the first motor 420 or to increase the first target speed V1 by the predetermined level C so as to remove as much water as possible absorbed in the washed clothes during the final spinning mode.

Moreover, the number of spinning modes may be increased.

The washing machine 400 may adjust the final spinning mode algorithm based on the drying environment if the overall power rates corresponding to the drying operation execution time are lower than the standard power rates.

More specifically, the washing machine 400 may transmit information representing that the drying operation execution time does not include any time period corresponding to power rates higher than the standard power rates to the EMS 300 when the overall power rates corresponding to the drying operation execution time are lower than or equal to the standard power rates.

The washing machine 400 may start the washing operation, determine whether the next mode is the final spinning mode while performing the washing operation, and transmit a final spinning mode entry signal to the EMS 300 (909) upon determining that the next mode is the final spinning mode.

Here, the EMS 300 may transmit a humidity and temperature sensing command to the drying machine 800.

Upon receiving the humidity and temperature sensing command from the EMS 300, the drying machine 800 may rotate the second motor 820 to operate the fan, sense the temperature and humidity of outside air sucked by the operation of the fan (705) when the fan operates for a predetermined time to circulate the air in the drying machine 800, and transmit the sensed temperature and humidity information to the EMS 300.

The EMS 300 may transmit the temperature and humidity information received from the drying machine 800 to the washing machine 300. In addition, the washing machine 400 may receive the temperature and humidity information from the weather server 500.

Upon receiving the temperature and humidity information from the EMS 300 (910), the washing machine 400 may determine the drying environment, calculate suitability for drying, which may decide a drying level suitable for the determined drying environment (911), and compare the calculated suitability with a reference value (912).

If the calculated suitability is lower than the reference value, the washing machine 400 may adjust the final spinning mode algorithm (913) and perform the final spinning mode based on the adjusted algorithm (908). Here, the final spinning mode algorithm may be adjusted in the same manner as described with reference to FIGS. 4 and 5.

If the calculated suitability is higher than the reference value, the washing machine 400 may perform the final spinning mode according to a predetermined final spinning mode algorithm (908).

Accordingly, the amount of water absorbed in washed clothes may be minimized during the final spinning mode, and thus the drying operation execution time and power consumption can be prevented from increasing due to poor drying environment.

Upon completing the washing operation, the washing machine 400 may transmit a washing operation completion signal to the EMS 300 (914).

Then, the EMS 300 may transmit a drying operation start command to the drying machine 800 in response to the washing operation completion signal.

The drying machine 800 may perform a drying operation according to the drying operation start command transmitted from the EMS 300.

Here, the drying machine 800 may calculate humidity variation (humidity variation rate per unit time: drying rate) based on the inner humidity of the washing machine 400, sensed through the humidity sensor 818*a*, during the drying operation, and perform the drying operation while controlling the driving factor of the drying operation based on the calculated humidity variation (that is, drying rate).

The drying machine 800 can adjust the driving factor since the amount of water left in the washed clothes has been minimized. Furthermore, it may also be possible to shorten the drying operation execution time.

Accordingly, power consumption of the drying operation can be reduced and the drying performance can be prevented from deteriorating.

According to an aspect, the final spinning mode algorithm may be adjusted so as to reduce power consumption of the drying operation if the power rates corresponding to the drying operation are higher than the standard power rates.

Furthermore, the overall power consumption may be prevented from sharply increasing so as to restrain additional generating operation of a power plant, thereby reducing destruction of the environment and preventing further power rate increase.

If the power rates corresponding to a drying operation are higher than the standard power rates, the drying operation may be performed in a state in which the final spinning mode algorithm is adjusted so as to remove as much water as possible from washed clothes, and thus drying performance deterioration can be prevented. Furthermore, the temperature and humidity of external air related to the drying operation may be sensed so as to determine a drying environment and the final spinning mode algorithm may be adjusted if the drying environment is considered to be poor in a state in which power rates are lower than or equal to the standard power rates, and thus the drying operation may be performed in a state in which the amount of water in the washed clothes is minimized. Accordingly, it may be possible to prevent a drying time from increasing, minimize power consumption, and achieve a drying level desired by the user.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A washing machine comprising:
   a motor;
   a communication unit receiving power rate information for each time period from an energy management system (EMS);
   an input unit receiving an operation command from a user; and
   a controller determining the power rate of the predetermined time duration in a spinning cycle is higher than a standard power rate before finishing the spinning cycle when a washing operation command and a drying operation command are input, executing a first spinning cycle if the power rate is lower than the standard power rate, and executing a second spinning cycle if the power rate is higher than the standard power rate.

2. The washing machine according to claim 1, wherein the controller extends a final spinning time of the motor when adjusting the final spinning mode algorithm.

3. The washing machine according to claim 1, wherein the controller increases a spinning speed of the motor when adjusting the final spinning mode algorithm.

4. The washing machine according to claim 1, wherein the controller controls the final spinning mode of the motor to be repeated if the drying operation execution time includes the time period corresponding to power rates higher than the standard power rates.

5. The washing machine according to claim 1, wherein the controller repeatedly increases and decreases a spinning speed of the motor when adjusting the final spinning mode algorithm.

6. The washing machine according to claim 1, wherein the controller controls the final spinning mode of the motor to be performed according to a predetermined algorithm when the drying operation execution time does not include the time period corresponding to power rates higher than the standard power rates.

7. The washing machine according to claim 1, wherein the controller confirms power rates corresponding to the drying operation execution time before the washing machine enters the final spinning mode of the motor.

8. The washing machine according to claim 1, wherein if the power rates corresponding to the drying operation execution time are higher than the standard power rates, the controller adjusts the final spinning mode algorithm of the motor based on a difference between the power rates corresponding to the drying operation execution time and the standard power rates.

9. The washing machine according to claim 1, wherein:
   the communication unit receives temperature and humidity information from a weather server; and
   the controller calculates suitability for drying based on the temperature and humidity information, compares the suitability with a reference value, adjusts the final spinning mode algorithm of the motor if the suitability is lower than the reference value, and performs the final spinning mode of the motor based on the predetermined algorithm if the suitability is higher than or equal to the reference value.

10. The washing machine according to claim 9, wherein the controller performs according to a predetermined algorithm if the suitability is higher than or equal to the reference value.

11. The washing machine according to claim 1, further comprising:
    a temperature sensor to sense external temperature; and
    a humidity sensor to sense external humidity,
    wherein the controller calculates suitability for drying based on the temperature and humidity information, compares the suitability with a reference value, and adjusts the final spinning mode algorithm of the motor if the suitability is lower than the reference value.

12. The washing machine according to claim 1, wherein the controller adjusts a driving factor of the drying operation if the power rates corresponding to the drying operation execution time are higher than the standard power rates.

13. The washing machine according to claim 1, wherein the controller adjusts the drying operation execution time if the power rates corresponding to the drying operation execution time are higher than the standard power rates.

14. A method of controlling a washing machine, comprising:
    receiving power rate information for each time period from an EMS when a washing operation command and a drying operation command are input by a user;
    confirming a drying operation execution time;
    determining power rates corresponding to the drying operation execution time based on the power rate information for each time period;
    comparing the power rates corresponding to the drying operation execution time with standard power rates, and determining whether the power rates are higher than the standard power rates; and adjusting an algorithm of a final spinning mode in the washing operation if the power rates corresponding to the drying operation execution time are higher than the standard power rates.

15. The method according to claim 14, wherein the adjusting of the final spinning mode algorithm includes extending a final spinning time.

16. The method according to claim 14, wherein the adjusting of the final spinning mode algorithm includes increasing a spinning speed.

17. The method according to claim 14, wherein the adjusting of the final spinning mode algorithm includes controlling the final spinning mode to be repeated.

18. The method according to claim 14, wherein the adjusting of the final spinning mode algorithm includes repeatedly increasing and decreasing the spinning speed.

19. The method according to claim 14, further comprising controlling the final spinning mode to be performed according to a predetermined algorithm if the power rates corresponding to the drying operation execution time are lower than or equal to the standard power rates.

20. The method according to claim 14, wherein the determining of whether the power rates are higher than the standard power rates includes determining whether there is a time period corresponding to power rates higher than the standard power rates.

21. The method according to claim 14, wherein the confirming of the power rates corresponding to the drying operation execution time includes confirming the power rates corresponding to the drying operation execution time before the washing machine enters the final spinning mode.

22. The method according to claim 14, further comprising:
receiving temperature and humidity information from a weather server before the washing machine enters the final spinning mode;
calculating suitability for drying based on the temperature and humidity information;
comparing the suitability with a reference value and adjusting the final spinning mode algorithm if the suitability is lower than the reference value; and
performing the final spinning mode based on the predetermined algorithm if the suitability is higher than or equal to the reference value.

23. The method according to claim 14, further comprising:
driving a fan before the washing machine enters the final spinning mode and sensing external temperature and external humidity;
calculating suitability for drying based on the temperature and humidity information;
comparing the suitability with a reference value and adjusting the final spinning mode algorithm if the suitability is lower than the reference value.

24. The method according to claim 14, further comprising adjusting at least one of a driving factor of the drying operation and the drying operation execution time if the power rates corresponding to the drying operation execution time are higher than the standard power rates.

25. A washing machine comprising:
a motor;
a communication unit receiving power rate information for each time period through an EMS and receiving drying operation information of a drying machine through the EMS; and
a controller determining whether a drying operation execution time of the drying machine includes a time period corresponding to power rates higher than standard power rates based on the power rate information for each time period when a washing operation is selected, and adjusting an algorithm of a final spinning mode of the motor in the washing operation if the drying operation execution time of the drying machine includes the time period corresponding to power rates higher than the standard power rates.

26. The washing machine according to claim 25, further comprising an input unit to which the drying operation execution time of the drying machine is input,
wherein the controller determines whether the input drying operation execution time includes a time period corresponding to power rates higher than the standard power rates when the drying operation execution time is input, and adjusts the algorithm of the final spinning mode of the motor in the washing operation if the input drying operation execution time includes the time period corresponding to power rates higher than the standard power rates.

27. The washing machine according to claim 25, wherein the controller performs at least one of extending a final spinning time of the motor, increasing a spinning speed of the motor, and repeatedly increasing and decreasing the spinning speed of the motor when adjusting the algorithm of the final spinning mode.

28. The washing machine according to claim 25, wherein the controller controls the final spinning mode of the motor to be repeated if the drying operation execution time of the drying machine includes the time period corresponding to power rates higher than the standard power rates.

29. The washing machine according to claim 25, wherein the controller controls the final spinning mode of the motor to be performed based on a predetermined algorithm if the drying operation execution time of the drying machine does not include the time period corresponding to power rates higher than the standard power rates.

30. The washing machine according to claim 29, wherein:
the communication unit receives temperature and humidity information from a weather server; and
the controller calculates suitability for drying based on the temperature and humidity information, compares the suitability with a reference value, adjusts the final spinning mode algorithm of the motor if the suitability is lower than the reference value, and performs the final spinning mode according to the predetermined algorithm if the suitability is higher than or equal to the reference value.

31. A method of controlling a washing machine, comprising:
determining whether a drying operation of a drying machine is selected when a washing operation is selected;
receiving power rate information for each time period and drying operation information of the drying machine through an EMS upon receiving a drying operation selection signal for the drying machine;
determining whether a drying operation execution time of the drying machine includes a time period corresponding to power rates higher than standard power rates based on the power rate information for each time period; and
adjusting an algorithm of a final spinning mode in the washing operation if the drying operation execution time of the drying machine includes the time period corresponding to power rates higher than the standard power rates.

32. The method according to claim 31, wherein the adjusting of the final spinning mode algorithm includes performing at least one of extending a final spinning time, repeatedly increasing and decreasing a spinning speed and increasing the spinning speed.

33. The method according to claim 31, wherein the adjusting of the final spinning mode algorithm includes controlling the final spinning mode to be repeated.

34. The method according to claim 31, further comprising controlling the final spinning mode to be performed according to a predetermined algorithm if power rates corresponding to the drying operation execution time are lower than or equal to the standard power rates.

35. The method according to claim 31, further comprising:
receiving information about an excess time corresponding to power rates higher than the standard power rates from the EMS;
determining whether the drying operation execution time includes the excess time; and
adjusting the algorithm of the final spinning mode in the washing operation if the drying operation execution time includes the excess time.

36. The method according to claim 31, further comprising:
receiving temperature and humidity signals from the drying machine if drying operation execution time does not include the time period corresponding to power rates higher than the standard power rates;
calculating suitability for drying based on the temperature and humidity signals;
comparing the suitability with a reference value and adjusting the final spinning mode algorithm if the suitability is lower than the reference value; and
performing the final spinning mode according to the predetermined algorithm if the suitability is higher than or equal to the reference value.

37. A power management apparatus comprising:
a communication unit to perform communication with a washing machine and a drying machine; and
a controller to determine whether a drying operation of the drying machine is selected when a washing operation selection signal is input from the washing machine, determine whether power rates corresponding to a drying operation execution time of the drying machine are higher than standard power rates when the drying operation of the drying machine is selected, adjust an algorithm of a final spinning mode of the washing machine if the power rates corresponding to the drying operation execution time are higher than the standard power rates, and control the adjusted final spinning mode algorithm to be transmitted to the washing machine.

38. The power management apparatus according to claim 37, wherein the controller transmits temperature and humidity sensing commands to the drying machine when a final spinning mode entry signal is transmitted from the washing machine, calculates suitability for drying based on sensed temperature and humidity information when the temperature and humidity information is transmitted from the drying machine, compares the suitability with a reference value, adjusts the algorithm of the final spinning mode if the suitability is lower than the reference value, and controls transmission of the adjusted final spinning mode algorithm to the washing machine.

39. The power management apparatus according to claim 38, wherein the controller performs at least one of extending a final spinning time, repeatedly increasing and decreasing a spinning speed, and increasing the spinning speed.

40. A washing machine comprising:
a motor;
a communication unit receiving power rate information for each time period through an EMS and receiving drying operation information of a drying machine through the EMS; and
a controller determining whether a drying operation execution time of the drying machine includes a time period corresponding to power rates higher than standard power rates based on the power rate information for each time period when a washing operation is selected, and performing at least one of extending a final spinning time of the motor, increasing a spinning speed of the motor, repeatedly increasing and decreasing the spinning speed of the motor, and repeating the final spinning mode of the motor if the drying operation execution time of the drying machine includes the time period corresponding to power rates higher than the standard power rates, and controls the final spinning mode of the motor to be performed based on a predetermined algorithm if the drying operation execution time of the drying machine does not include the time period corresponding to power rates higher than the standard power rates.

41. The washing machine according to claim 40, wherein:
the communication unit receives temperature and humidity information from a weather server; and
the controller calculates suitability for drying based on the temperature and humidity information, compares the suitability with a reference value, adjusts the final spinning mode algorithm if the suitability is lower than the reference value, and performs the final spinning mode according to the predetermined algorithm if the suitability is higher than or equal to the reference value.

42. The washing machine according to claim 1, wherein the first spinning cycle has a spinning time different from a spinning time of the second spinning cycle.

43. The washing machine according to claim 1, wherein the first spinning cycle has a speed different from a speed of the second spinning cycle.

* * * * *